(12) United States Patent
Pollack et al.

(10) Patent No.: US 7,744,312 B2
(45) Date of Patent: Jun. 29, 2010

(54) OFFSHORE PIPE STRING SYSTEM AND METHOD

(75) Inventors: Jack Pollack, Houston, TX (US); David C. Riggs, Coppell, TX (US)

(73) Assignee: Single Buoy Moorings, Inc. (CH)

( * ) Notice: Subject to any disclaimer, the term of this patent is extended or adjusted under 35 U.S.C. 154(b) by 515 days.

(21) Appl. No.: 11/595,707

(22) Filed: Nov. 10, 2006

(65) Prior Publication Data

US 2008/0112763 A1 May 15, 2008

(51) Int. Cl.
*F16L 1/12* (2006.01)
*E21B 17/01* (2006.01)
(52) U.S. Cl. .................. 405/170; 405/169; 405/224.2; 166/367
(58) Field of Classification Search ............. 405/169, 405/170, 173, 184.5, 195.1, 211, 224.2; 166/367
See application file for complete search history.

(56) References Cited

U.S. PATENT DOCUMENTS

| | | | |
|---|---|---|---|
| 1,756,597 A * | 4/1930 | Keenan | ............... 285/123.14 |
| 6,364,022 B1 | 4/2002 | Kodaissi et al. | |
| 6,394,154 B1 | 5/2002 | Pollack | |
| 2002/0054789 A1 * | 5/2002 | Alliot | ................ 405/224.2 |
| 2005/0063788 A1 | 3/2005 | Clausen | |
| 2006/0201564 A1 | 9/2006 | Pllack et al. | |
| 2007/0056155 A1 * | 3/2007 | Reimert | ................... 29/456 |
| 2007/0063517 A1 * | 3/2007 | Pallini et al. | ............... 285/390 |

FOREIGN PATENT DOCUMENTS

WO WO 2004/035375 A1 4/2004

* cited by examiner

*Primary Examiner*—David J Bagnell
*Assistant Examiner*—Benjamin Fiorello
(74) *Attorney, Agent, or Firm*—Leon D. Rosen (57) ABSTRACT

A pipe string (44) is pulled out by a tug boat (30) from a floating structure (12) such as a production vessel, as pipe sections (54, 56) are connected in series on the vessel, to eventually lay the pipe string in a catenary curve from the vessel to the sea floor and then along the sea floor to a distant subsea well head (86). To save time and cost in coupling the pipe sections, lower fatigue resistant pipe couplings, such as non weld-on couplings (120) that include a threaded sleeve (134), are used to connect pipe sections that will lie in a quiescent zone such as on the sea floor (zone Az), and in a zone (Cz) lying along the middle of the catenary curve. Higher fatigue resistant pipe couplings such as weld-on couplings (150) are used along active zones such as top and bottom zones (Dz, Bz) of the catenary curve.

6 Claims, 5 Drawing Sheets

OFFSHORE PIPE STRING SYSTEM AND METHOD

CROSS-REFERENCE

Applicant claims priority from U.S. patent application Ser. No. 11/352,595 filed Feb. 13, 2006.

BACKGROUND OF THE INVENTION

An offshore production riser system usually includes multiple conduits through which various produced fluids (e.g. oil, gas, water, etc.) are transported between the seabed and the surface of the water body. Conduits also may be used for off-loading lines, fluid injection lines and service, electrical and hydraulic control lines.

It is known to lay a rigid or steel pipeline so it extends from a sub sea well or other fluid source on the sea floor using conventional submerged pipe laying techniques and curve one end of the pipeline upward in a gentle catenary path, or J-curve, through the turbulence zone and connect it directly to a submerged buoy or to a vessel floating on the surface. These rigid risers are commonly referred to as Steel Catenary Risers or "SCR's".

A large field scenario may take years to fully develop, during which additional risers are occasionally laid to connect to wells. It is advantageous to minimize or eliminate the need for high cost special pipe lay vessels by self-installing the pipelines and risers from the Floating Production Unit (FPU). In this concept, a J-lay or workover rig is mounted on the deck of an FPU to deploy the pipeline at controlled, near-vertical angles. As the pipe string is deployed, it is pulled out by a direct pull (DP) tug. Instead of moving the rig and vessel relative to the pipeline, the FPU remains stationary as the pipeline is dragged outward toward a subsea well or tie-in location.

Alternatively a steel riser pipe can be assembled at a drilling rig, dragged away from it by a tug boat and be connected to a moored FPU or a sub sea well. These pipelines are assembled at the vessel and can for example be used as a seabed supported pipeline, a vertical riser, a Steel Catenary Riser (SCR) or as a steel midwater pipe arrangement which is supported by two floaters.

One pipe lay method is the J-lay, used especially in water of at least 600 meters depth, where pipe sections lying in a near vertical position are connected and moved down into the sea. It has been common to weld together the adjacent ends of each pair of pipes. It can take over a half hour to make weld connections and inspect them, and this adds considerably to costs. Applicant makes pipe connections by turning a threaded part to make a threaded connection. It takes about 15 minutes to make a threaded connection and move down the pipe string to ready it for another connection.

There are two major types of suitable threaded pipe couplings, and each has pipe sections with threaded ends. One type is a higher fatigue resistance coupling with at least the internally threaded pipe end being of enlarged outside diameter. An example of this is a weld-on type where male and female threaded sleeves are machined from thick forgings and welded to the ends of two pipe sections. A second type is a lower fatigue resistance coupling with threaded pipe ends of no greater outside diameter than the rest of each pipe section. An example is a non weld-on type where male threads are machined on the ends of two pipe sections and an intermediate threaded heavy wall forging sleeve screws the pipe ends together. Applicant notes that in some threaded connections of the higher fatigue resistance type, an upset forging is used to create a heavy walled internal pipe end with a threaded connection machined directly onto the upset end of the pipe. The weld-on pipe couplings require custom forgings, welds, machining of welds, and inspection of welds as by x-ray and/or ultrasonic techniques. Applicant estimates the cost for a 10 inch pipe weld-on coupling set ready to be transported to the ship for threaded coupling thereat, to be about $3000 to $5000. The cost for a non weld-on threaded sleeve type coupling for a 10 inch pipe is about $800 per coupling set. The difference between the two types is about $3000 per coupling set.

Generally, weld-on pipe couplings are useful in J-lay pipe strings for their high fatigue resistance. The upper region of the catenary portion of the pipe string is subjected to repeated bending as a floating body experiences heave, roll, pitch, drift, etc. as a result of waves, winds and currents. The lower region of the catenary portion of the pipe string also is subjected to repeated bending as the pipe string is repeatedly pulled up and laid down on the sea floor due to vessel movements. Weld-on pipe couplings can better avoid fatigue failure at these regions. If the pipestring should be damaged, a large section of the submerged pipeline has to be replaced, which is expensive especially in deep waters where divers cannot be used. A pipe string that could reliably avoid damage but which greatly reduced cost, would be of value.

SUMMARY OF THE INVENTION

In accordance with one embodiment of the invention, applicant uses different types of pipe couplings along different portions of the laid pipe string. For pipe couplings that will lie along an active zone such as a TDZ (Touch Down Zone) of the catenary curve, and along an upper zone of the catenary curve, high fatigue resistance couplings are used. This generally means that threaded weld on pipe couplings are used thereat.

For pipe couplings that will lie passively on the sea floor (but not in the TDZ), and for pipe couplings that will lie between the TDZ and the upper zone of the catenary curve, lower fatigue resistance couplings are used. This generally means that non weld-on threaded couplings are used thereat, with pipe section ends that are each of no greater diameter than the rest of the pipe section.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
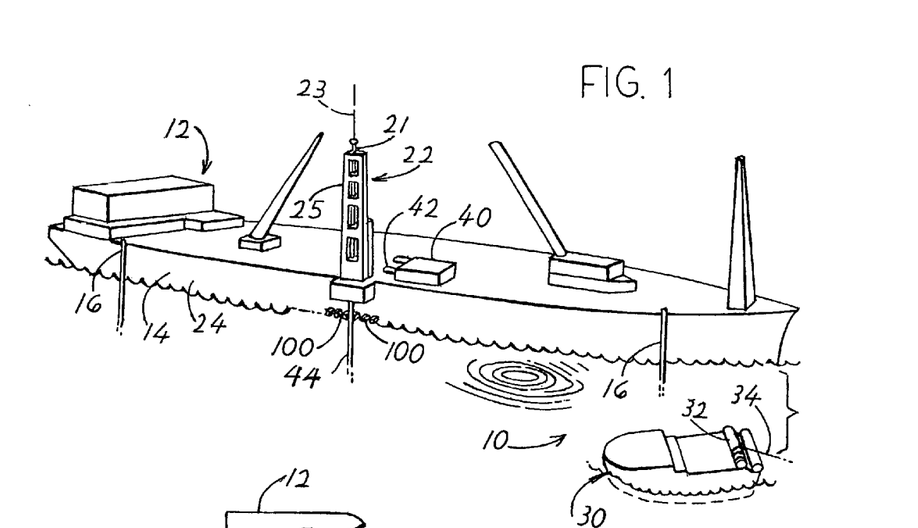
FIG. 1 is an isometric view of a production system of the invention, showing a FPU (floating production unit) and the near end of a pipe string, and showing a tug boat.

FIG. 1 illustrates a hydrocarbon production system 10 which includes a FPU (floating production unit) 12 that has a vessel hull 14 that is anchored to the sea floor as by mooring though multiple mooring lines 16. A J-lay tower 22 is mounted on the hull, at one side 24, with the J-lay tower extending beyond the hull side. The J-lay tower includes a winch 25 that is designed to hold a long pipe section 21, with the axis 23 of each pipe section being primarily vertical as its lower end is connected to the upper end of the last pipe section to be deployed. The following description of the installation of a pipe string assumes the use of steel pipes of 10 inch diameter that come in lengths of 24 or 37 meters. A string of pipe sections usually has a total length of more than 1000 meters, so a large number of pipe sections will be connected in series to create a pipe string 44 that is commonly referred to as a riser after it is installed.

Figure 2:
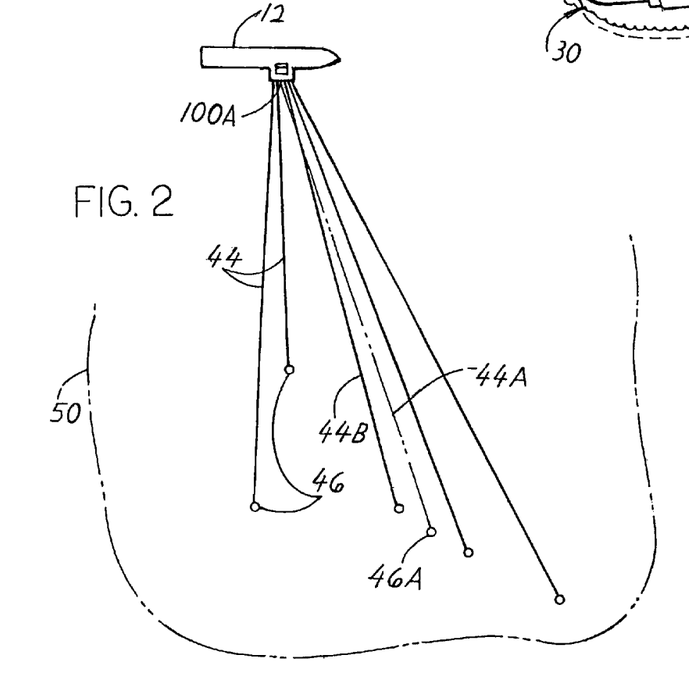
FIG. 2 is a plan view of the production system of FIG. 1.

FIG. 1 shows a tug boat 30 which applicant uses to pull out the pipe string to install it. The tug boat, or tug, is a dynamically positioned boat with a GPS (global positioning system) unit, so it can maintain itself at a desired position and can be moved in any direction on the sea surface. The tug boat has a motor-powered winch 32 that allows it to pay out and pull in a tug line 34, such as a steel cable. The PDU has hydrocarbon processing facilities 40 as to remove sand and water from hydrocarbons, with ports 42 for receiving hydrocarbons from installed pipe strings, or risers. FIG. 2 shows that the FPU may be connected to a large number of pipe strings, or risers 44 that each extends to a different well head 46 that connects to a well in a sub sea reservoir 50.

Figure 3:
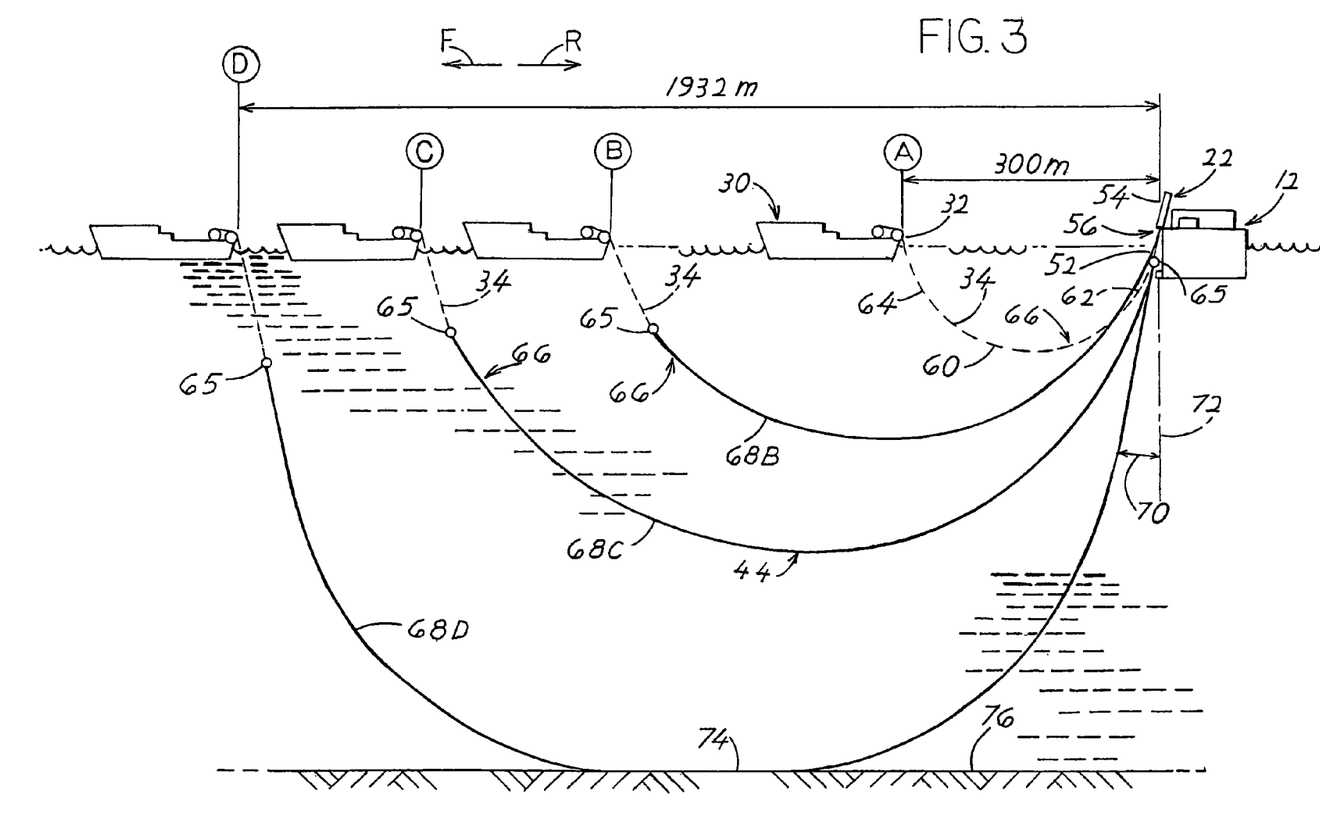
FIG. 3 is a side elevation view of the production system of FIG. 1, showing the tug boat and pipe string at four different position during the installation of the pipe string.

FIG. 3 shows four different stages in the installation of a riser. In a first stage, the rear of the tug is at position A, and a first pipe section 52 has been lowered from the J-lay tower 22 while a connection is being made to the next pipe section 54. The upper end of the first pipe section is considered to be the near end 56 of the pipe string (now consisting of a single pipe). The tug line 34 extending rearwardly R from the tug, extends in a double catenary curve 60 (portion 62 extends at a forward-downward incline and portion 64 extends at a forward-upward incline) to the lower end of the first pipe section 52. The rear end of the tug line is attached by a connector 65 to the front or far end of the pipe string. As additional pipe sections are attached in tandem to the first one, the tug operates its winch 32 to pull in the tug line so the pipe string extends along progressively greater percentages of the combination 66 of pipe string and deployed length of pull line, until the pipe string portion at 68B extends in a double catenary curve as at tug position B. Each portion of the pipe string can be referred to as a pipe string because it includes a string of pipes, or as a pipe string portion because it is a portion of the final, longer pipe string, or riser.

When the tug pull line 34 has been sufficiently shortened at tug position B and pipe sections are added, the tug is moved forward in steps and maintained in a stationary position between those steps. By now, at tug position B, the connection 65 that lies at the rear of the tug pull line, lies along a forward-upward incline. When sufficient pipe sections have been added that the near end angle 70 has decreased to the lower end of the range of angles such as 3° to 6°, the tug is moved forward F until the near end angle has increased as to 10° to 12°. The tug is then held in position while additional pipe sections are added and the angle decreases to 6°, when the tug is advanced again. FIG. 3 shows the tug at positions B and C with the tug line 34 at a constant length, and with the pipe string portion at 68B and 68C being of progressively greater lengths as additional pipe sections have been added. If the final riser is long enough compared with the depth of the sea, which is the usual case, then the tug will reach the position D at which the pipe string portion 68D has a part 74 that rests on the sea floor 76. The tug continues to move forward in steps while pipe sections are added, with the middle pipe string part 74 sliding along the sea floor. The sea floor has been surveyed to make sure that the pipe string part on the sea floor will not be damaged.

In one installation method that applicant has designed for a 10 inch steel pipe, the tug initially lies at position A (FIG. 3) which is 300 meters forward of the FPU 12, with a 750 meter length of tug line 34 extending to the FPU. The pipe string lengthens as pipe sections are added, and the tug pulls in its pull line, and then moves forward in steps with pipe sections added between steps. A tug pull line length of a plurality of hundreds of meters, and usually a plurality of thousands of meters, will be required in most systems.

Figure 4:
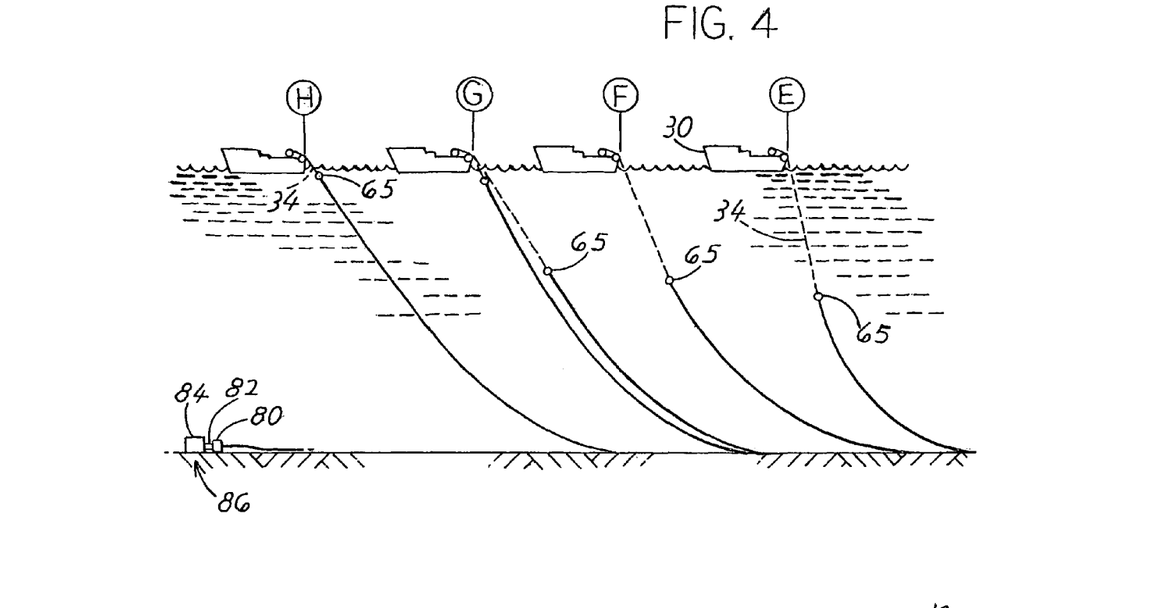
FIG. 4 is a side elevation view of the production system of FIG. 3, shown at four later positions during the installation of a pipe string.

FIG. 4 shows the tug as it moves progressively more forward through positions E, F and G until it reaches a position H. Then, the winch on the tug is operated to pull in its tug pull line 34 so the connector 65 lies at only a small depth. A pipeline end termination 80 is attached to the far end of the pipe string, and the pipe string is lowered to the sea floor to connect to a connection 82 of a well head platform 84 of a well head 86 at the sea floor that has been previously installed. A remotely operated vehicle is usually used to accompany the pipeline end termination down to the well head and to help make the connection.

Figure 5:
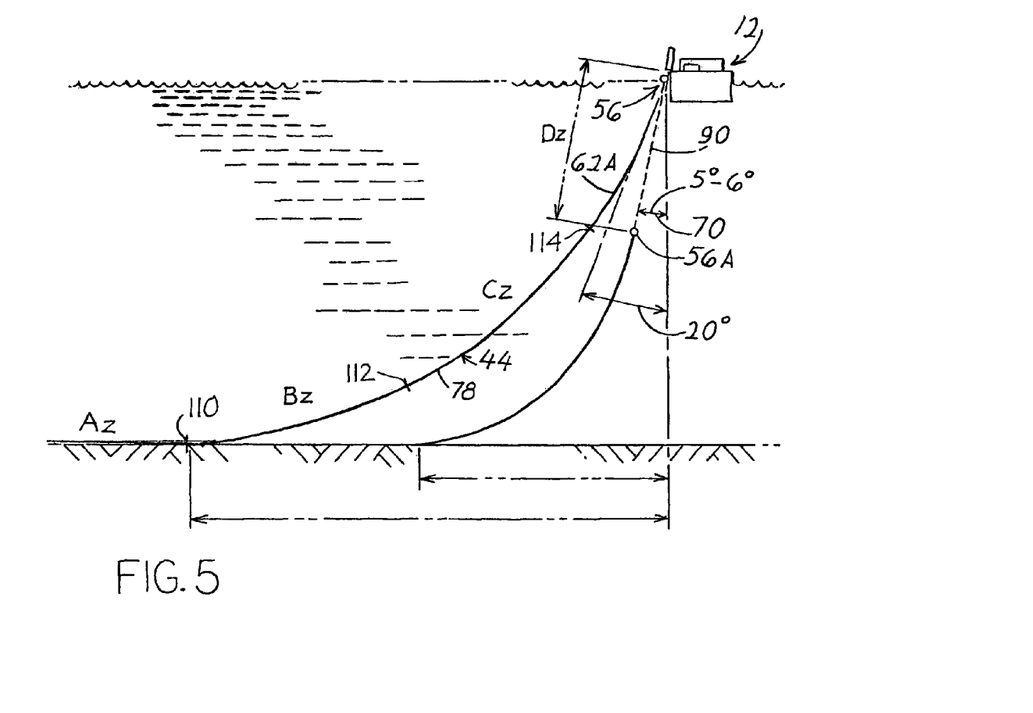
FIG. 5 is a side elevation view of the FPU of FIG. 3 during final stages in the installation of the pipe string.

Before the far end of the pipe string, which is held by the tug is pulled to the position at G or H, activity takes place at the near end 56 (FIG. 5) of the pipe string, at the FPU (floating production unit) 12. FIG. 5 shows that applicant attaches a line 90 to a winching device such as a winch of the J-lay tower or a separate winch, and to the near end 56 of the pipe string, and operates the winching device to lower the near end of the pipe string a plurality of meters (a depth of more than 10 meters) below the FPU to position 56A. After the far end of the pipe string has been pulled further forward, applicant operates the winch device to raise the pipe string near end 56A to the deck of the FPU and connects the pipe string near end to the hydrocarbon-receiving port 42 (FIG. 1). The raising of the near end of the pipe string so the near end portion lies at 56, increases the near end angle 70 (FIG. 5) from about 6° to about 20° (15° to 28°). With the near end portion at 62A of the pipe string which is now serving as a portion of the riser, extending at such a large angle, tension in the riser near end part 62A greatly increases. This higher tension avoids buckling of the near end part 62A of the riser from compression in the event of storms that produce large waves.

FIG. 1 shows that the FPU can be provided with several ducts 100 that each guides a pipe string (e.g. 44, 44A, 44B in FIG. 2) in its primarily downward extension into the sea. A separate duct is used for each pipe string, or riser to prevent risers from rubbing against each other.

A pipe string, or riser, such as 44 in FIG. 5, contains a large number of pipe sections connected in tandem by a large number of pipe couplings. In one example, a pipe string lies in a sea location of a depth of 1000 meters and extends to a subsea well horizontally spaced by 2000 meters from a location directly under the FPU. If the pipe sections each have a length of 24 meters, then about one hundred fifteen pipe sections and pipe coupling sets will be used. A pipe coupling set connects adjacent ends of two pipes.

As mentioned above, the riser such as 44 in FIG. 5 can be divided into four zones labeled Az, Bz, Cz and Dz in FIG. 5. The last three zones extend in a primarily catenary curve 78 while the first zone Az extends largely straight. The first zone Az is the region where the riser lies on the sea floor at all times (after installation) and is a quiescent zone. The pipe couplings in this zone must be strong enough to withstand forces while the pipe is dragged along the sea floor during installation, but they do not undergo repeated stress changes that could lead to fatigue failure.

The second zone Bz is the TDZ, or touch down zone, that extends from point 110 to point 112 and is an active zone where repeated changes in bending forces are applied to the riser. Point 110 is where the pipestring begins to lift off the sea floor when the FPU 12 undergoes large movements in heave, pitch, roll and drift as in a large storm. The point 112 lies a plurality of meters above the sea floor, and usually at least 10 meters above the sea floor, in the quiescent condition of the system. The point 1 10 is a location that is almost picked up off the sea floor when the vessel drifts away from the point 110 and vessel roll, etc. raises the pipe string.

The third zone Cz, which is a quiescent zone, extends from point 112 up to a point 114 that is located a plurality of tens of meters below the sea surface and tens of meters below the bottom of the hull of the PDU 12. Although the pipe string portion in this zone moves up and down as the PDU moves, this pipe string portion does not undergo large changes in bending forces or changes in bending.

The fourth zone Dz, which is an active zone, extends from point 114 to the PDU. This zone Dz undergoes large changes in bending forces and bending as the PDU moves.

In accordance with the invention, applicant reduces the cost for installing the pipe string, or riser, by using both high fatigue resistance pipe joints or couplings, and lower fatigue resistance pipe joints or couplings along the pipe string. The higher fatigue resistance couplings, such as threaded weld-on couplings, are used along the active zones Bz and Dz. The lower fatigue resistance couplings, such as intermediate threaded heavy wall forging couplings, are used along the quiescent zones Az and Cz. Sometimes the term fatigue "strength" is used instead of fatigue resistance.

Figure 6:
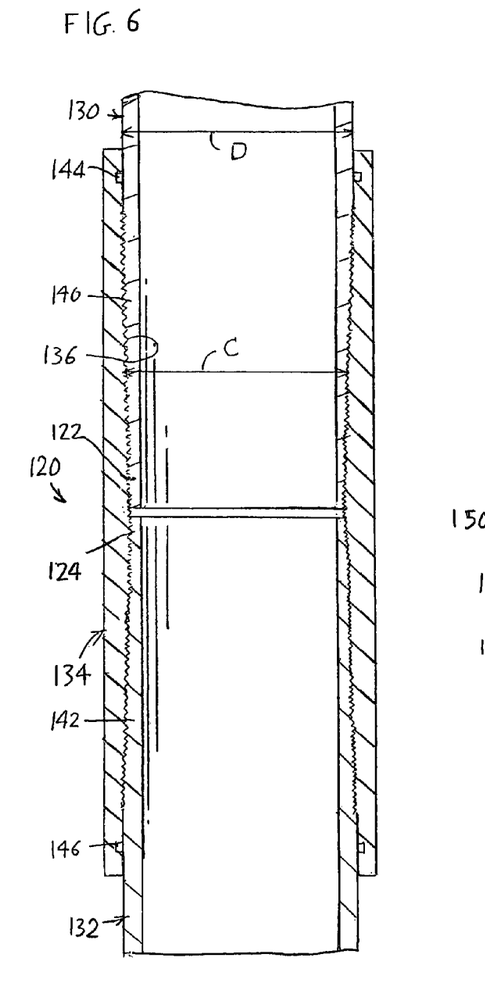
FIG. 6 is a sectional view of a non weld-on pipe coupling that includes a sleeve threadably connected to adjacent ends of a pair of pipe sections.

FIG. 6 shows an example of a non weld-on pipe coupling 120 can be used along the quiescent zones Az and Cz. This coupling consists of an internal tapered threaded pipe coupling sleeve 134 formed from a forging, which joins adjacent ends 122, 124 of two tapered threaded pipe sections 130, 132. The sleeve 134 has internal tapered (pipe) threads 136 at both ends and is turned or screwed first over a threaded end part 140 of one threaded pipe section and then over the threaded end part 142 of the other threaded pipe section. The tapered threaded pipe coupling 120 can be provided with seals 144, 146 at both ends to avoid the ingress of seawater. This coupling allows for a quick and safe coupling of pipe ends in an offshore situation.

Not shown are threaded pipe couplings where the pipe ends are provided with a male and female part and the pipe ends are directly coupled to each other with an external connector device. In this design the thread is also directly cut in a pipe section end and one pipe section end has normally been upset before the (female) threads were cut. In the above mentioned design as well as the one shown in FIG. 6 the thread is cut directly into the pipe section end, which makes it a lower fatigue resistance coupling. Pipe sections are constructed by steel extrusion without forging. Steel forgings have a higher strength and fatigue resistance than non forged steel parts.

Figure 7:
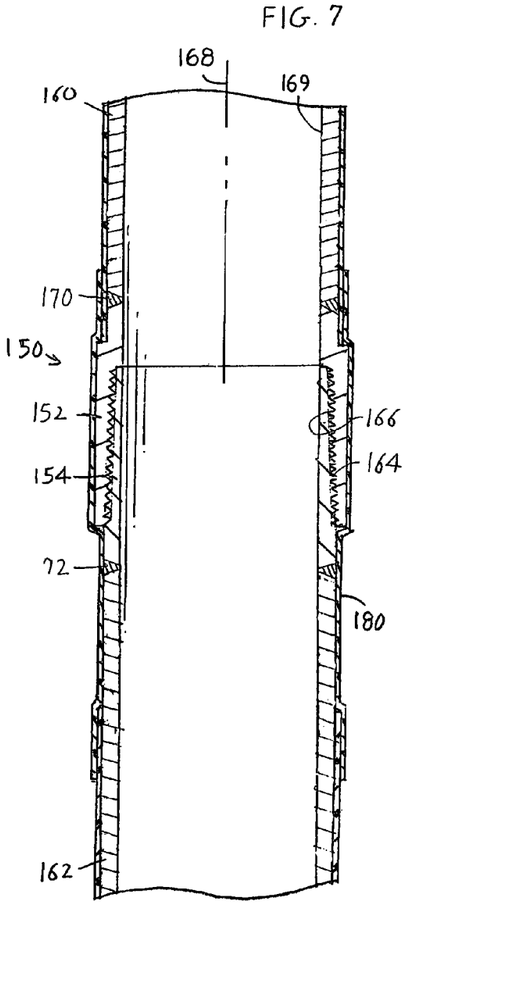
FIG. 7 is a sectional view of a weld-on pipe coupling shown connecting adjacent ends of a pair of pipe sections.

FIG. 7 shows an example of a higher fatigue resistance coupling, such as a threaded weld-on coupling which can be used along the active zones Bz and Dz. In this figure a threaded pipe coupling 150 is shown that joins adjacent ends of two pipe sections 160, 162. This type of threaded connector is called weld-on or integral connector, wherein a threaded female connector part 152 is welded at 170 to an end of one pipe 160, and a threaded male connector part 154 is welded at 172 to an end of the other pipe 162. A male thread 164 is machined in one connector part which is welded to a pipe section end and a female thread 166 is machined in the other connector part. Although not shown in FIG. 6, the wall thickness of the connector parts 152, 154 is often much greater (least 1.5 times) than the wall thickness of the pipe. The welding and inspection of the welds internally and externally, is done on shore before the pipes are brought onto an installation vessel. During coupling of the pipe ends in an offshore situation the pipe are gripped and one is turned to thread it to the other. The figure also shows heat shrink layers 180 that can be applied over the pipe string in an offshore situation but for this process no machine inspection is required. The threads such as 164, 166 of all connector parts of every coupling of the invention, each has a thread axis 168 that lies in the passage 169 along which fluid flows.

Although the weld-on pipe coupling 150 of FIG. 7 has a higher fatigue resistance than the non welded-on pipe coupling 120 of FIG. 6, the weld-on pipe coupling has a much higher cost. The weld-on couplings 150 require ordering of steel forgings, which are machined and then welded on to the pipe ends at 170, 172. The welds must be inspected. Some additional time is required to place a plastic shrink wrap 180 over the joint to keep out water. Applicant estimates a cost of about US $3000 to $5000 per weld-on coupling set, or pipe connection. This compares to a cost of about $800 for each non weld-on pipe coupling 120 of FIG. 6, for a saving of about $3200 per coupling.

Figure 8:
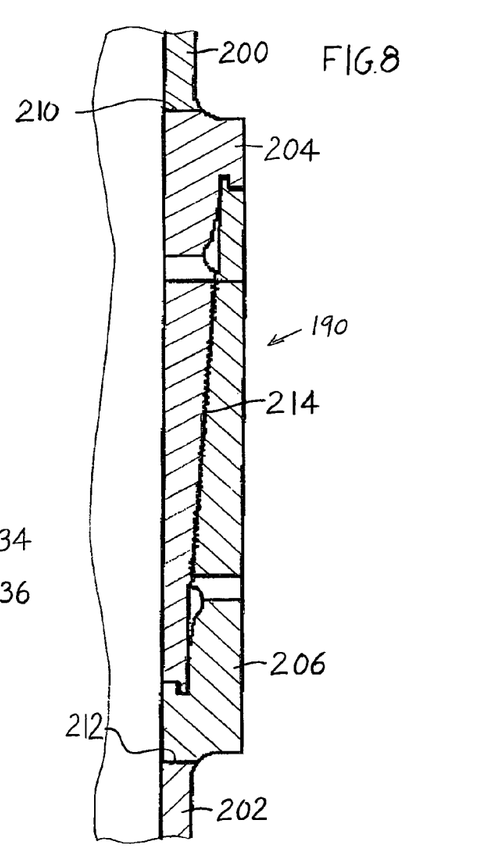
FIG. 8 is a partial sectional view of another design of weld-on pipe coupling.

FIG. 8 shows another weld-on pipe coupling 190 that connects adjacent ends of two pipes 200, 202. Forged connector parts 204, 206 are welded at welds 210, 212 to the pipe ends. The connector parts have threads that are threadably connected at 214. The pipe ends can have parallel threads that are brought into engagement by applying a high pressure fluid between parts 204 and 206.

Figure 9:
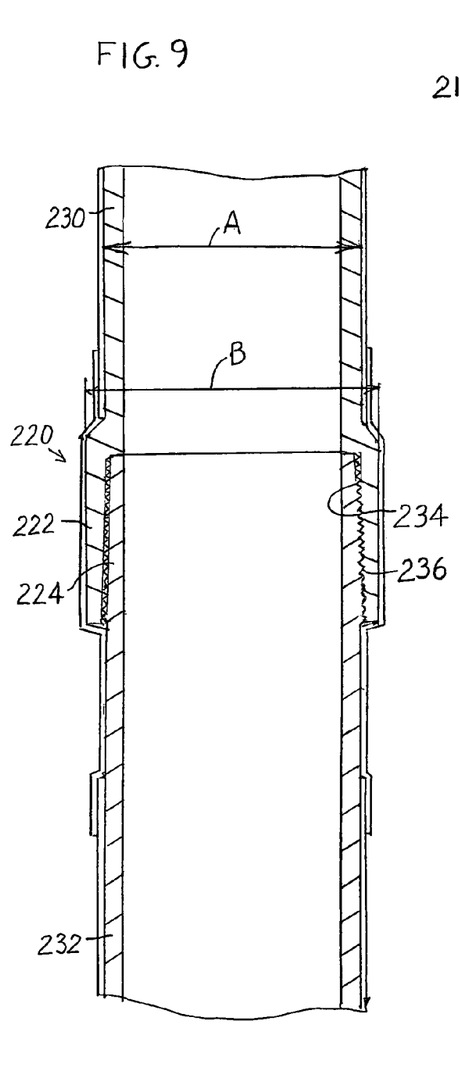
FIG. 9 is a sectional view of a high fatigue resistance coupling shown connecting adjacent ends of a pair of pipe sections.

FIG. 9 shows a higher fatigue resistance coupling 220 that joins adjacent ends 222, 224 of two pipe sections 230, 232. The female end 222 of pipe section 230 has been heated and forged to expand its outer diameter and increase its wall thickness (the pipe is shortened slightly), and it has been formed with a thread 234. The male end 224 usually has also been heated and forged to increase its wall thickness and is threaded at 236. This type of coupling has not been widely used because of the high cost of forging the ends, but if the cost can be reduced, the coupling 220 could be readily used.

One characteristic present in the higher fatigue resistant couplings 150, 190, and 220 of FIGS. 7, 8 and 9 which is not present in the lower fatigue resistance coupling of FIG. 6, concerns a pipe end diameter. One threaded end such as 222 (FIG. 9) of the higher fatigue coupling has a larger outside diameter, such as B than the outside diameter A of the majority of the length of the pipe section. In the lower fatigue strength coupling at least one pipe end (e.g. 122, 124 of FIG. 6) has an outside diameter C no greater than that of the outside diameter D of the majority of the pipe length.

We can consider the example given above for FIG. 5 for a J-lay pipe string installed in a sea of a depth of 1000 meters and connecting to a subsea well 2000 meters from a location under the upper end of the pipe string, with pipe sections each of 24 meters length. The zone Az has a length of 792 meters and includes 33 pipe couplings. The zone Cz has a length of 744 meters and has 31 pipe joints. The zone Dz has a length of 432 meters and has 18 pipe joints. The use of 64 non weld-on couplings instead of only weld-on couplings results in a saving of $200,000 for the pipe string. Pipe strings can have much longer lengths resting on the sea floor, and several pipe strings may be installed during development of a field, so considerable savings can be realized by applicant's systems.

Thus, the invention provides a catenary riser system that extends from a floating structure down along a primarily catenary curve to the sea floor, and along the sea floor to a location that is distant (usually at least 600 meters) from a position under the floating structure. The system is usually used in a sea region having a depth of more than 600 meters. Applicant identifies zones along the pipe string where there is a probability (e.g. of over 5%) that the pipe string will be subjected to repeated (at least 1000 times) bending torque (e.g. on the order of at least 100 foot-pounds) during its lifetime of use, and applicant uses higher fatigue resistance couplings such as the threaded weld-on couplings of FIG. 7 along those zones. Applicant also identifies zones where it is almost certain (e.g. over 99% certain) that the pipe string will be subjected to minimal repeated bending torque (e.g. less than half the torque of 100 foot-pounds for 1000 times) and uses lower fatigue resistance, less expensive non weld-on threaded couplings (usually less than half the high fatigue resistance) along those zones, such as the threaded couplings in which a thread is cut in the pipe ends as is shown in FIG. 6 and the threaded pipe ends are connected by an internally threaded sleeve. Applicant uses higher fatigue resistance pipe joints for over 75% and preferably all of the pipe joints along the active zones, and uses lower fatigue resistance pipe joints along a majority, and preferably at least 75% of the pipe joints along the quiescent zones. In higher fatigue resistance couplings, at least one pipe end generally has a greater outside diameter than that of the majority of the pipe length, while in lower fatigue resistance couplings both pipe ends have outside diameters no greater than that of the rest of the pipe sections.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A catenary riser system which includes a pipe string formed by multiple steel pipe sections connected in series by threaded pipe joints, and forming a passage (169) that fluid flows through, wherein threads of each of said pipe joints has a thread axis lying in the corresponding passage, with the pipe string extending from a floating structure that floats in a sea of a sea depth of a plurality of hundreds of meters to at least a predetermined location on the sea bed, wherein the pipe string has a catenary portion lying in the water and extending in a generally catenary curve from the floating structure to the sea floor and the pipe string has a sea floor quiescent zone (Az) resting on the sea floor, the catenary portion including a touchdown active zone (Bz) extending from the sea floor to a height of a plurality of meters above the sea floor and an upper active zone (Dz) extending a plurality of meters below the floating structure, with the pipe string being subjected to repeated bending in the touchdown zone (Bz) and in the upper zone (Dz) as the floating structure moves, the catenary portion also including an in between quiescent zone (Cz) lying between the upper active zone and the touchdown active zone, wherein:

along at least one of said quiescent zones the pipe joints connecting each of a plurality of pairs of series-connected pipe sections is a lower fatigue resistance pipe joint;

along at least one of said active zones the pipe joints connecting each of a plurality of pairs of series-connected pipe sections is a higher fatigue resistance pipe joint that has a higher fatigue resistance than said lower fatigue resistance pipe joints.

2. The system described in claim 1 wherein:

all of said pipe joints include threaded connections between pairs of connected pipe sections;

said lower fatigue resistance joints are non weld-on joints wherein joined ends of two pipe section comprise threads formed directly in the pipe sections rather than in parts that are welded to the pipe sections, and said higher fatigue resistance pipe joints are weld-on joints that include threaded parts that are welded to ends of the pipe sections.

3. The system described in claim 1 wherein:

said lower fatigue resistance joints each includes male threads cut into each of two pipe section ends, and also each includes a sleeve with a female internal thread that is threadably engaged with both pipe section ends.

4. The system described in claim 1 wherein:

said lower fatigue resistance pipe joints are used along both of said quiescent zones (Az and Cz) and said higher fatigue resistance pipe joints are used along both of said active zones (Bz and Dz).

5. A method for installing a pipe string so it extends from a floating structure to a predetermined location on the sea floor, by repeatedly connecting steel pipe sections in series by the use of pipe joints to extend a pipe string, and lowering the resulting extension of the pipe string into the sea to create a pipe string with a near end at the floating structure and an opposite far end, and while operating a tug boat coupled to the far end of the pipe string to pull the far end away from the floating structure as the pipe string is lengthened, until a fully installed pipe string configuration is reached wherein a near portion of the pipe string extends in a primarily catenary curve to the sea floor and a sea floor portion of the pipe string extends from the near portion along the sea floor to said predetermined location on the sea floor, including:

connecting each pair of adjacent ends of a pair of pipe sections of a first group of pipe sections that are intended to lie in a zone (Az) along said sea floor portion of the pipe string, with a low fatigue resistance pipe joint;

connecting each of a pair of adjacent ends of a pair of pipe sections of a second group of pipe sections that are intended to lie in a touchdown transition zone (Bz) that extends between said sea floor portion and a height above the sea floor of more than ten meters, with high fatigue resistance pipe joints that each has a higher fatigue resistance than said low fatigue resistance pipe joints.

6. The method described in claim 5 wherein:

said step of connecting each pair of pipe sections with a low fatigue resistance pipe joint includes establishing threads in pipe section ends that are integral with the rest of the corresponding pipe section and connecting the pipe section ends in a threaded connection; and said step of connecting a pair of pipe sections with a high fatigue resistance joint includes creating a weld joint between each pipe section end and a threaded connection part, before transferring the pipe sections to said floating structure, and later threadably connecting together the threaded connection parts that are welded to a pair of pipe section ends.

* * * * *